United States Patent
Sanga et al.

(10) Patent No.: US 12,376,213 B2
(45) Date of Patent: Jul. 29, 2025

(54) SYSTEMS AND METHODS FOR TOUCHLESS PASSENGER LIGHT CONTROL

(71) Applicant: Goodrich Corporation, Charlotte, NC (US)

(72) Inventors: Srinivas Sanga, Bangalore (IN); Gaurav Sahay, Bangalore (IN); Jeremy John Fredrich, West Allis, WI (US)

(73) Assignee: Goodrich Corporation, Charlotte, NC (US)

( * ) Notice: Subject to any disclaimer, the term of this patent is extended or adjusted under 35 U.S.C. 154(b) by 430 days.

(21) Appl. No.: 17/845,719

(22) Filed: Jun. 21, 2022

(65) Prior Publication Data
US 2023/0156890 A1    May 18, 2023

(30) Foreign Application Priority Data
Nov. 15, 2021    (IN) .............................. 202141052309

(51) Int. Cl.
| | | |
|---|---|---|
| *H05B 47/115* | (2020.01) | |
| *B60Q 3/80* | (2017.01) | |
| *G06F 3/03* | (2006.01) | |
| *H05B 47/165* | (2020.01) | |

(52) U.S. Cl.
CPC .............. *H05B 47/115* (2020.01); *B60Q 3/80* (2017.02); *G06F 3/03* (2013.01); *H05B 47/165* (2020.01)

(58) Field of Classification Search
CPC ........... H05H 2242/22; H05H 2245/10; H05H 1/466; H05H 1/46; H05B 47/115; H05B 47/165; B60Q 3/80; G06F 3/03; G06F 3/044; G06F 3/0482; G06F 2203/04101; G06F 3/04847
See application file for complete search history.

(56) References Cited

U.S. PATENT DOCUMENTS

| | | | |
|---|---|---|---|
| 9,365,291 B2 | 6/2016 | Savian | |
| 10,112,716 B2 | 10/2018 | Gagnon et al. | |
| 10,146,320 B2 | 12/2018 | Schalla et al. | |
| 10,320,384 B2 * | 6/2019 | Lohbihler | .............. G08C 17/02 |
| 2007/0035955 A1 | 2/2007 | Puschmann | |

(Continued)

FOREIGN PATENT DOCUMENTS

| | | |
|---|---|---|
| CN | 102801409 | 11/2014 |
| EP | 3021641 | 5/2016 |

(Continued)

OTHER PUBLICATIONS

European Patent Office, European Search Report dated Mar. 16, 2023 in Application No. 22206999.9.

(Continued)

*Primary Examiner* — Renan Luque
(74) *Attorney, Agent, or Firm* — SNELL & WILMER L.L.P.

(57) ABSTRACT

A touchless light system may comprise a light assembly, a light controller operably coupled to the light, and a touchless control panel configured to detect and interpret a user input and send an object detection signals to the light controller based on the user input. The light controller may be configured to send to a light command to the light assembly based on the object detection signal.

13 Claims, 8 Drawing Sheets

(56) References Cited

U.S. PATENT DOCUMENTS

2008/0259590 A1* 10/2008 De Goederen-Oei ........................
                                                     H05B 47/175
                                                         362/85
2013/0293722 A1    11/2013 Chen
2016/0135263 A1*   5/2016 Chen ..................... F21V 23/008
                                                        315/250
2017/0321905 A1*  11/2017 Buriola ............... F24C 15/2064
2020/0137844 A1    4/2020 Johannessen
2021/0107400 A1*   4/2021 Erler ..................... H03K 17/96

FOREIGN PATENT DOCUMENTS

| EP | 3939885    | 1/2022  |
| EP | 4109222    | 12/2022 |
| WO | 2006041417 | 4/2006  |
| WO | 2016191560 | 11/2014 |
| WO | 2016162694 | 10/2016 |

OTHER PUBLICATIONS

European Patent Office, European Office Action dated Nov. 7, 2024 in Application No. 22206999.9.

* cited by examiner

SYSTEMS AND METHODS FOR TOUCHLESS PASSENGER LIGHT CONTROL

CROSS-REFERENCE TO RELATED APPLICATIONS

This application claims priority to, and the benefit of, India Patent Application No. 202141052309, filed Nov. 15, 2021 (DAS Code D62A) and titled "SYSTEMS AND METHODS FOR TOUCHLESS PASSENGER LIGHT CONTROL," which is incorporated by reference herein in its entirety for all purposes.

FIELD

The present disclosure relates generally to light assemblies and, more particularly, to touchless light systems for aircraft and methods for operating touchless light systems.

BACKGROUND

Modern aircraft typically include passenger reading lights located throughout the aircraft cabin. For example, each seat may have a dedicated reading light located in the ceiling panel over the seat. The passenger reading lights are manually operated (e.g., the passenger manually turns the light on/off, positions the light at a desired angle, and/or selects the desired brightness). Pathogens may be present on contact surfaces of an aircraft cabin and can spread to passengers and/or crew members through contact with the surface. The safety of passengers and crew members may be improved by reducing the number of surfaces a passenger directly contacts (e.g., touches) during a flight.

SUMMARY

A touchless light system is disclosed herein. In accordance with various embodiments, the touchless light system comprises a light assembly, a light controller operably coupled to the light assembly, and a touchless control panel. The touchless control panel configured to detect and interpret a user input and send an object detection signal to the light controller based on the user input. The light controller is configured to send to a light command to the light assembly based on the object detection signal received from the touchless control panel.

In various embodiments, the touchless control panel includes a touchless sensor configured to detect an object within a detection region a surface of the touchless control panel, and a touchless control module operably coupled to the touchless sensor. The touchless control module is configured to determine a location of the object over the surface based on an electrical signal received from the touchless sensor. The touchless control module outputs the object detection signal based on the location of the object over the surface.

In various embodiments, the touchless sensor is configured to project an electromagnetic field over the surface of the touchless control panel. In various embodiments, the touchless control module is configured to send an on/off object detection signal to the light controller in response to determining the object is located over an on/off region of the surface, and the light controller is configured to output an on/off light command to the light assembly in response to receiving the on/off object detection signal.

In various embodiments, the touchless control module is configured to send an increase intensity object detection signal to the light controller in response to determining the object is located over an increase intensity area of the surface, and the light controller is configured to output an increase intensity light command to the light assembly in response to receiving the increase intensity object detection signal.

In various embodiments, the touchless control module is configured to send a decrease intensity object detection signal in response to determining the object is located over a decrease intensity area of the surface, and the light controller is configured to output a decrease crease intensity light command to the light assembly in response to receiving the decrease intensity object detection signal.

In various embodiments, the touchless control module is configured to send a mode control object detection signal in response to determining the object is located over a mode control region of the surface, and the light controller is configured to output at least one of a focus beam light command, an increase area light command, a decrease area light command, or a custom pattern light command in response to receiving the mode control object detection signal.

In various embodiments, the touchless control module is configured to change an image displayed in the mode control region of the surface in response to determining the object is located over a mode select region of the surface.

A method for controlling a touchless light system is also disclosed herein. In accordance with various embodiments, the method may comprise detecting, by a touchless sensor, an object located in a detection region over a surface of a touchless control panel; receiving, by a touchless control module, an electrical signal from the touchless sensor; determining, by the touchless control module, a location of the object over the surface based on the electrical signal received from the touchless sensor; outputting, by the touchless control module, an object detection signal based on the location of the object; receiving, by a light controller, the object detection signal; and outputting, by the light controller, a light command to a light assembly based on the object detection signal.

In various embodiments, determining, by the touchless control module, the location of the object over the surface comprises determining, by the touchless control module, the object is located in an on/off region of the surface.

In various embodiments, the method may further comprise determining, by the touchless control module, whether to turn on the light assembly or turn off the light assembly; and at least one of commanding, by the touchless control module, a display of the touchless control panel to illuminate at least one of a mode control region, an intensity control region, or a mode select region in response to the touchless control module determining to turn on the light assembly; or commanding, by the touchless control module, the display of the touchless control panel to stop illuminating at least one of the mode control region, the intensity control region, or the mode select region in response to the touchless control module determining to turn off the light assembly.

In various embodiments, determining, by the touchless control module, the location of the object over the surface comprises determining, by the touchless control module, the object is located over an increase intensity area of the surface, and the light command is configured to increase an intensity of a light emitted by the light assembly.

In various embodiments, determining, by the touchless control module, the location of the object over the surface comprises determining, by the touchless control module, the object is located over a decrease intensity region of the surface, and the light command is configured to decrease an intensity of a light emitted by the light assembly.

In various embodiments, determining, by the touchless control module, the location of the object over the surface comprises determining, by the touchless control module, the object is located over a mode control region of the surface, and light command comprises at least one of a focus beam direction light command, an increase area light command, a decrease area light command, or a custom pattern light command.

In various embodiments, determining, by the touchless control module, the location of the object over the surface comprises determining, by the touchless control module, the object is located over a mode select region of the surface, and the method may further include commanding, by the touchless control module, a display of the touchless control panel to change an image displayed in the mode control region.

In various embodiments, the touchless sensor comprise a projected capacitive sensor configured to project an electromagnetic field over the surface of the touchless control panel.

An article of manufacture including a tangible, non-transitory computer-readable storage medium having instructions stored thereon for controlling a touchless light system is also disclosed herein. In accordance with various embodiments, the instruction, in response to execution by a touchless control module, cause the touchless control module to perform operations comprising receiving, by the touchless control module, an electrical signal from a touchless sensor; determining, by the touchless control module, a location of an object over a surface of a display based on the electrical signal received from the touchless sensor; outputting, by the touchless control module, an object detection signal to a light controller based on the location of the object.

In various embodiments, determining, by the touchless control module, the location of the object over the surface comprises determining, by the touchless control module, whether the object is located over a mode control region of the surface; determining, by the touchless control module, whether the display is in at least one of a first mode of light control, a second mode of light control, or a third mode of light control, in response to determining the object is located over the mode control region; and determining, by the touchless control module, whether to output the object detection signal as at least one of a focus beam object detection signal, a change area object detection signal, or a customs shape object detection signal based on whether the display is in the first mode of light control, the second mode of light control, or the third mode of light control.

In various embodiments, determining, by the touchless control module, the location of the object over the surface comprises determining, by the touchless control module, whether the object is located over an intensity control region of the surface; and determining, by the touchless control module, whether to output the object detection signal as at least one of an increase intensity object detection signal or a decreasing intensity object detection signal sending in response to the touchless control module determining the object is located over the intensity control region of the surface.

In various embodiments, determining, by the touchless control module, the location of the object over the surface comprises determining, by the touchless control module, whether the object is located over an on/off region of the surface, and the operations further comprise commanding, by the touchless control module, the display to illuminate at least one of a mode control region, an intensity control region, or a mode select region in response to the touchless control module determining the object is located over the on/off region of the surface.

In various embodiments, determining, by the touchless control module, the location of the object over the surface comprises determining, by the touchless control module, whether the object is located over a mode selection region of the surface; and changing, by the touchless control module, an image displayed in a mode control region of the display in response to the touchless control module determining the object is located over at least one of a first change mode area or a second change mode area in the mode selection region of the display.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein are systems and methods for touchless control of a passenger cabin light. In accordance with various embodiments, the system includes a touchless control panel which operates the respective passenger cabin light (also referred to as a passenger overhead reading light). In various embodiments, the control panel includes projective capacitive sensor configured to detect and react to a user's finger located a short distance from a surface of the control panel. The touchless control panel is configured to allow the user (e.g., passenger) to control turning the passenger cabin light on/off and adjusting an intensity/brightness of the light. In various embodiments, the user may also control one or more of a direction of the light output by the passenger cabin light, the size of the illumination area of the light, and/or a shape of the illumination area.

Figure 1:
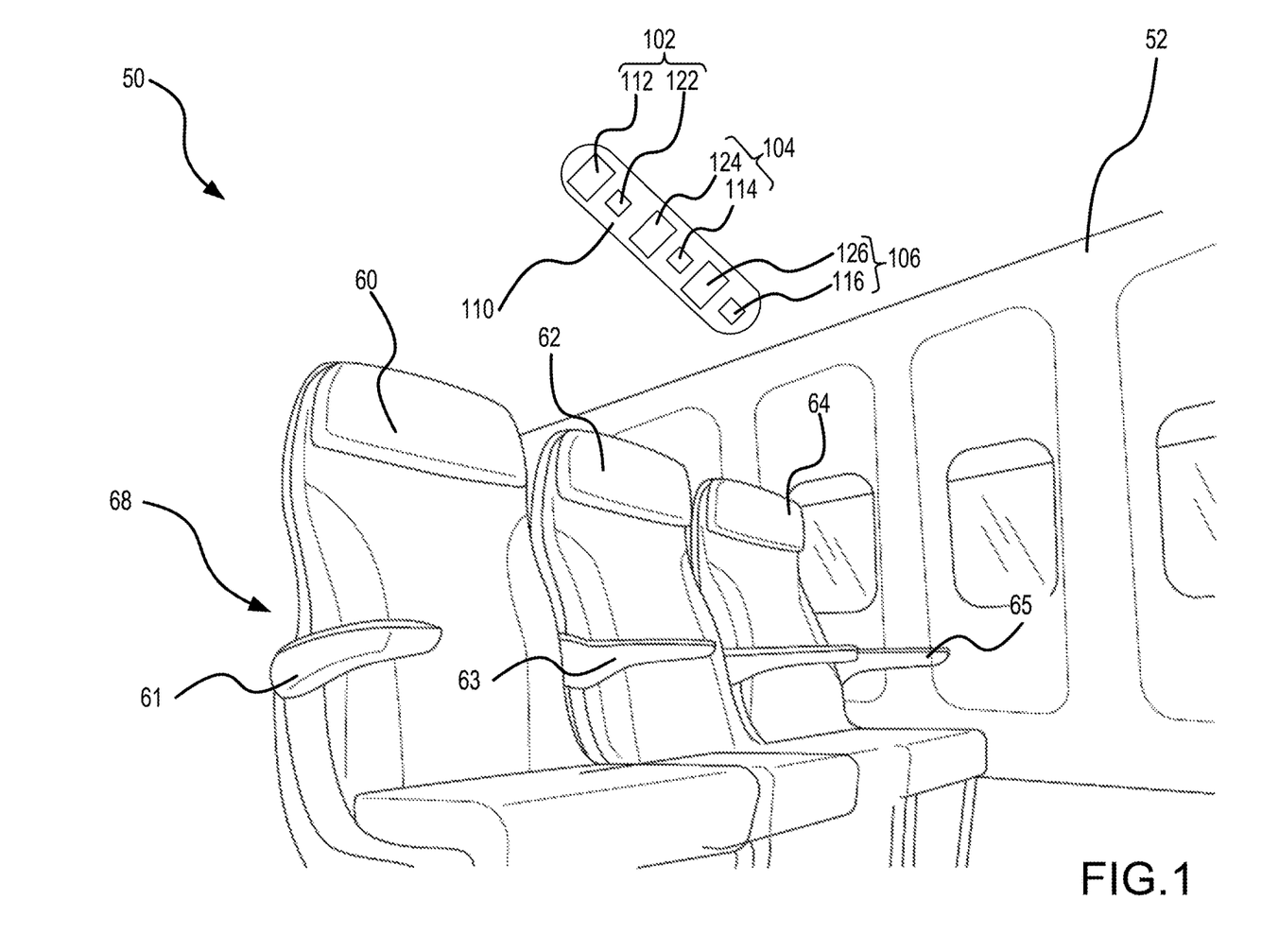
FIG. 1 illustrates a view of a cabin of an aircraft, in accordance with various embodiments.

With reference to FIG. 1, a portion of a cabin 50 of an aircraft 52 is shown, according to various embodiments. The aircraft 52 may be any aircraft such as an airplane, a helicopter, or any other aircraft. The cabin 50 may include passenger seats such as first seat 60, second seat 62, and third seat 64. First seat 60, second seat 62, and third seat 64 may be located in a row 68 of cabin 50. Touchless light systems, such as first touchless light system 102, second touchless light system 104, third touchless light system 106, may be installed over and/or correspond to each passenger seat in a respective row in cabin 50. For example, first touchless light system 102 is installed over first seat 60, second touchless light system 104 is installed over second seat 62, and third touchless light system 106 is installed over third seat 64.

Each touchless light system includes a light assembly and a touchless control panel. In this regard, first touchless light system 102 includes a first light assembly 112 and a first touchless control panel 122. Second touchless light system 104 includes a second light assembly 114 and a second touchless control panel 124. Third touchless light system 106 includes a third light assembly 116 and a third touchless control panel 126. In various embodiments, first light assembly 112 and first touchless control panel 122, second light assembly 114 and second touchless control panel 124, and third light assembly 116 and third touchless control panel 126 may each be incorporated and/or installed in a passenger service unit (PSU) 110 located in the ceiling above row 68. While first touchless control panel 122, second touchless control panel 124, and third touchless control panel 126 are illustrated and described as located in PSU 110, it is contemplated and understood that the touchless control panels may located in any locations. For example, in various embodiments, first touchless control panel 122 may be located on the seatback of the seat directly in front of first seat 60, second touchless control panel 124 may be located on the seatback of the seat directly in front of second seat 62, and third touchless control panel 126 may be located on the seatback of the seat directly in front of third seat 64. In various embodiments, first touchless control panel 122 may be located on an armrest 61 of first seat 60, second touchless control panel 124 may be located on an armrest 63 of second seat 62, and third touchless control panel 126 may be located on an armrest 65 of third seat 64.

Figure 2:
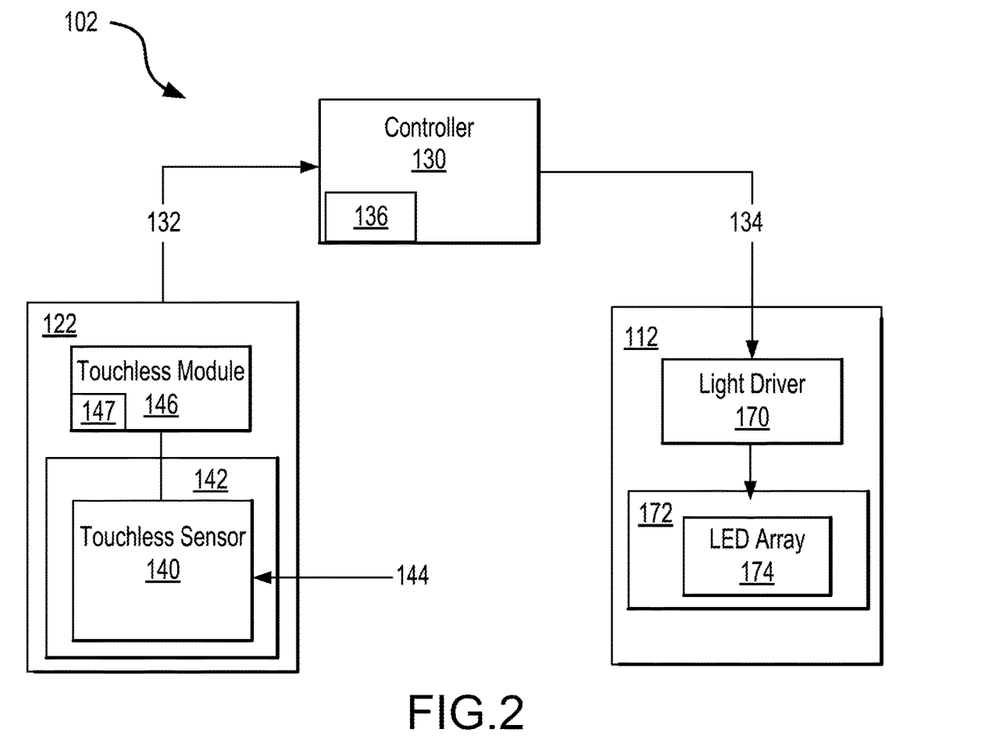
FIG. 2 illustrates a schematic view of a touchless light system, in accordance with various embodiments.

With additional reference to FIG. 2, a schematic of first touchless light system 102 is illustrated. While first touchless light system 102 is illustrate and described with reference to FIGS. 2, 3, 4A, 4B, and 4C, it is contemplated and understood that each of the touchless light systems in cabin 50 (e.g., second touchless light system 104 and third touchless light system 106) include the features and functionalities as described herein with reference to first touchless light system 102.

In accordance with various embodiments, first touchless light system 102 includes a light controller 130. Light controller 130 is operably coupled to touchless control panel 122 and light assembly 112. Light controller 130 is configured to receive and interpret object detection signals 132 output from first touchless control panel 122. Light controller 130 is further configured send light commands 134 to first light assembly 112 based on the object detection signal 132 received from first touchless control panel 122.

Light controller 130 may include one or more logic devices such as one or more of a central processing unit (CPU), an accelerated processing unit (APU), a digital signal processor (DSP), a field programmable gate array (FPGA), an application specific integrated circuit (ASIC), or the like (e.g., light controller 130 may utilize one or more processors of any appropriate type/configuration, may utilize any appropriate processing architecture, or both). In various embodiments, light controller 130 is in communication with, and may include, any non-transitory memory 136 known in the art. The memory 136 may store instructions usable by the logic device(s) of light controller 130 to perform operations related to controlling first touchless light system 102. Any appropriate computer-readable type/configuration may be utilized as the memory 136, any appropriate data storage architecture may be utilized by the memory 136, or both.

In accordance with various embodiments, first touchless control panel 122 includes a touchless sensor 140. Touchless sensor 140 may be formed as part of a display 142 of first touchless control panel 122. As described in further detail below, touchless sensor 140 is configured to detect a user input 144. A touchless control module 146 of first touchless control panel 122 is configured to interpret the user input 144 detected by touchless sensor 140 (e.g., detect a location of the user input over display 142) and output object detection signal 132 to light controller 130 based on the detected user input 144.

Touchless control module 146 may include one or more logic devices, such as one or more of a CPU, an APU, a DSP, a FPGA, an ASIC, or the like (e.g., touchless control module 146 may utilize one or more processors of any appropriate type/configuration, may utilize any appropriate processing architecture, or both). Touchless control module 146 is in communication with and may include any non-transitory memory 147 known in the art. The memory 147 may store instructions, usable by the logic device(s) of touchless control module 146, to perform operations related to determining a location of user input 144, controlling touchless control panel 122, and/or communicating with light controller 130.

In various embodiments, touchless sensor 140 is configured to detect user input 144. User input 144 may correspond to a presence, a location, and/or a movement of a detectable object (e.g. a finger, stylus, or other detectable object) located within a detection distance (also referred to as a detection region) from touchless sensor 140, without the detectable object needing to be in direct contact with touchless sensor 140 and/or display 142. Touchless sensor 140 may include one sensor, two sensors, or an array of sensors, with the sensor(s) being capable of determining distance in one or more directions and being touchless in a "height" dimension (i.e., in a direction perpendicular to a surface 150 (FIG. 3) of display 142).

In various embodiments, touchless sensor 140 may be a projected capacitive sensor. For example, and with additional reference to FIG. 3, in various embodiments, touchless sensor 140 includes a projected capacitive sensor configured to detect the presence of an electromagnetic field-absorbing object 154 within a detection region D near surface 150 of touchless control panel 122. In various embodiments, touchless sensor 140 includes a pattern of X (or first) electrodes 160 and a pattern of Y (or second) electrodes 161. X-electrodes 160 and Y-electrodes 161 form a grid pattern in a plane parallel to surface 150 (e.g., in the X-Y plane). In various embodiments, surface 150 may be formed by a protective layer 158 formed of, for example, glass or plastic located over the electrodes. X-electrodes 160 and Y-electrodes 161 may project an electromagnetic field into the detection region D over surface 150. Detection region D may extend a distance 152 from surface 150. Touchless sensor 140 is configured to generate a capacitance coupling with an electromagnetic field-absorbing object 154 (e.g., a finger of a user) located in detection region D. Stated differently, a capacitance coupling between object 154 and X-electrodes 160 and Y-electrodes 161 is generated in response to object 154 coming within distance 152 of surface 150. Touchless sensor 140 is configured to generate the capacitance coupling without object 154 directly contacting surface 150. The capacitance coupling with object 154 changes the electrostatic capacitance between the X-electrodes 160 and the Y-electrodes 161 at, or near, object 154. Touchless control module 146 determines a location and/or a movement of object 154 over surface 150 based on the location(s) where the electrostatic capacitance changes occur. Touchless control module 146 outputs object detection signals 132 based on the determined location(s) of the electrostatic capacitance changes.

Returning to FIG. 2, light controller 130 is configured to send light commands 134 in response to, and based on, object detection signals 132. Light commands 134 may be sent to a light driver 170 of first light assembly 112. Light commands 134 are configured to control a light source 172 of first light assembly 112. In various embodiments, light source 172 includes an array of light emitting diodes (LEDs) 174. Light commands 134 may control the light output by light source 172. For example, light commands 134 may control which LEDs 174 are powered on and/or an intensity of light output by one or more of the LEDs 174 and/or a color of light output by one or more of the LEDs 174. Light commands 134 may also be employed to control a liquid crystal display (LCD) array over the LEDs 174, a DLP matrix, a liquid crystal lens for beam shape, and/or any other light system of first light assembly 112.

Light driver 170 may adjust which LEDs 174 are powered on and/or an amount of current provided to one or more LEDs 174 based on the light commands 134 received from light controller 130.

In accordance with various embodiments, touchless control module 146 may make determination regarding the images to displayed on display 142 and/or the mode in which touchless control panel 122 controls light source 172 based on user input t144 (e.g., based on a location of object 154 (FIG. 3) over touchless sensor 140). With reference to FIGS. 4A, 4B, and 4C various display image layouts for display 142 of touchless control panel 122 are illustrated.

FIG. 4A illustrates an exemplary display layout for a first mode of light control. FIG. 4B illustrates an exemplary display layout for a second mode of light control. FIG. 4C illustrates an exemplary display layout for a third mode of light control.

In various embodiments, display 142 may include an "on/off" region 180, an instructions region 182, a mode control region 184, an intensity control region 186, and a mode select region 188. With combined reference to FIG. 2, FIG. 3 and FIGS. 4A, 4B, and 4C, in accordance with various embodiments, in response to determining object 154 is located over on/off region 180, touchless control module 146 sends a "on/off" (or first) object detection signal 132 to light controller 130. The on/off object detection signal 132 is configured to cause light controller 130 to send an "on/off" light command 134 to light driver 170. The on/off light command 134 causes light driver 170 to power on or power off light source 172. In various embodiments, on/off light command 134 causes light source 172 to power on if light source 172 is currently off, and to power off if light source 172 is currently on.

In various embodiments, instructions region 182 includes images, words, symbols, and/or the like configured to convey to a user that display 142 does not need to be touched to control first light assembly 112. In various embodiments, the instructions conveying to the user that display 142 does not need to be touched may be located separate from display 142. For example, the instructions may be located on a placard or a sticker located near display 142, or in an airline safety manual.

In various embodiments, in response to determining object 154 is located over intensity control region 186, touchless control module 146 determines whether the object 154 is located over an increase intensity area 186a of intensity control region 186 or a decrease intensity area 186b of intensity control region 186. In response to determining the object 154 is located over increase intensity area 186a, touchless control module 146 sends an "increase intensity" object detection signal 132 to light controller 130. In response to receiving the increase intensity object detection signal 132, light controller 130 sends an increase intensity light command 134 to light driver 170. The increase intensity light command 134 causes light driver 170 to at least one of increase a number LEDs 174 that are powered on and/or increase an intensity (e.g., brightness) of the light output by one or more of the LEDs 174. In response to determining object 154 is located over decrease intensity area 186b, touchless control module 146 sends a decrease intensity object detection signal 132 to light controller 130. In response to receiving the decrease intensity object detection signal 132, light controller 130 sends a decrease increase intensity light command 134 to light driver 170. The decrease intensity light command 134 causes light driver 170 to decrease a number LEDs 174 that are powered on and/or to decrease an intensity (e.g., brightness) of the light output by the one or more of the LEDs 174.

Figure 3:
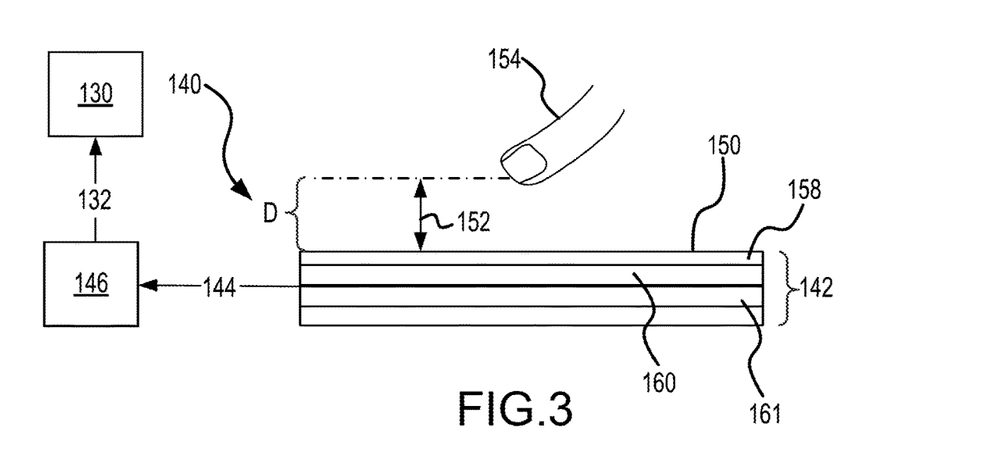
FIG. 3 illustrates an object located over a touchless sensor of a touchless light system, in accordance with various embodiments.
Figure 4A:
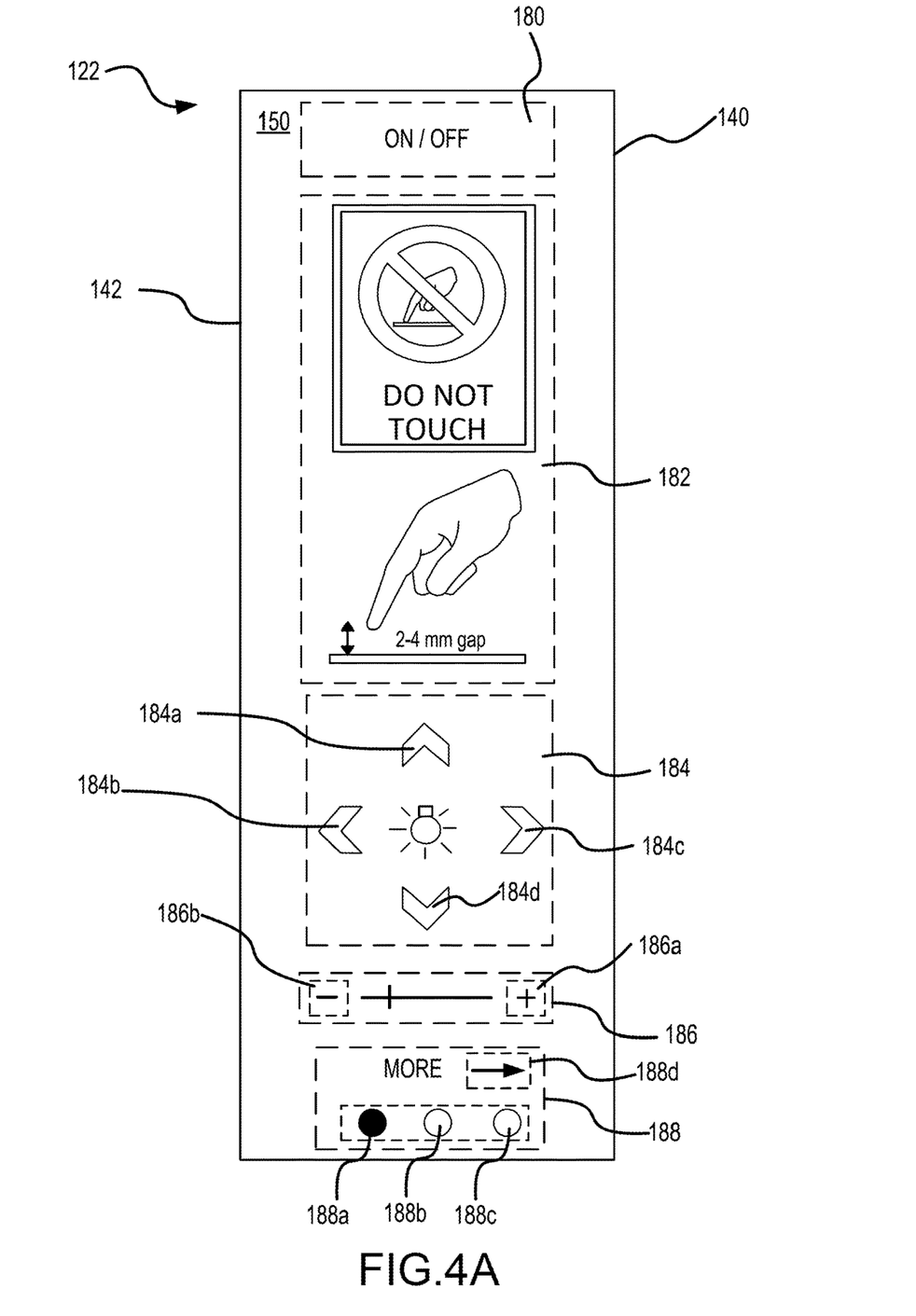
FIGS. 4A, 4B, and 4C illustrates a display of a touchless light system, in accordance with various embodiments.
Figure 4B:
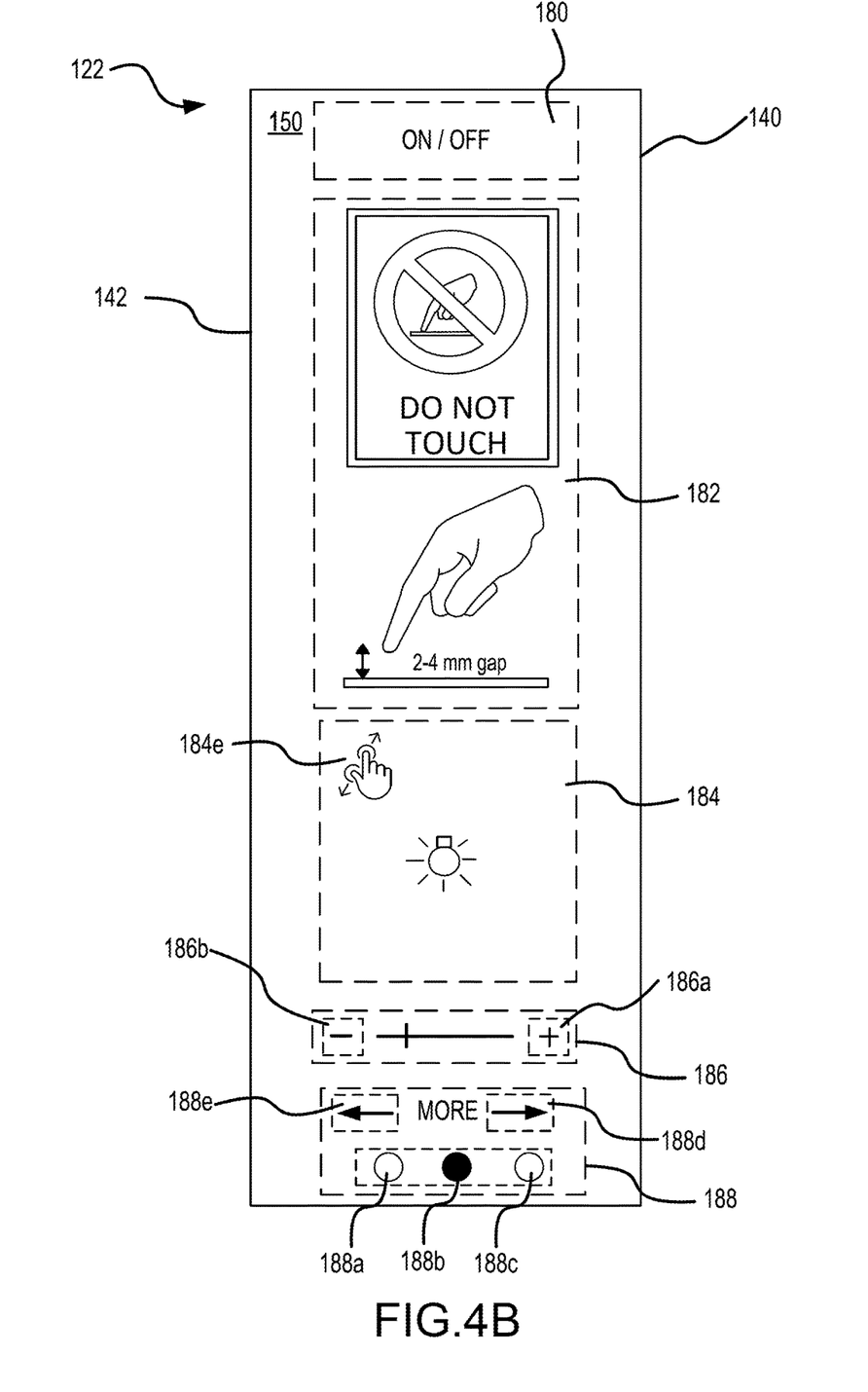
Figure 4C:
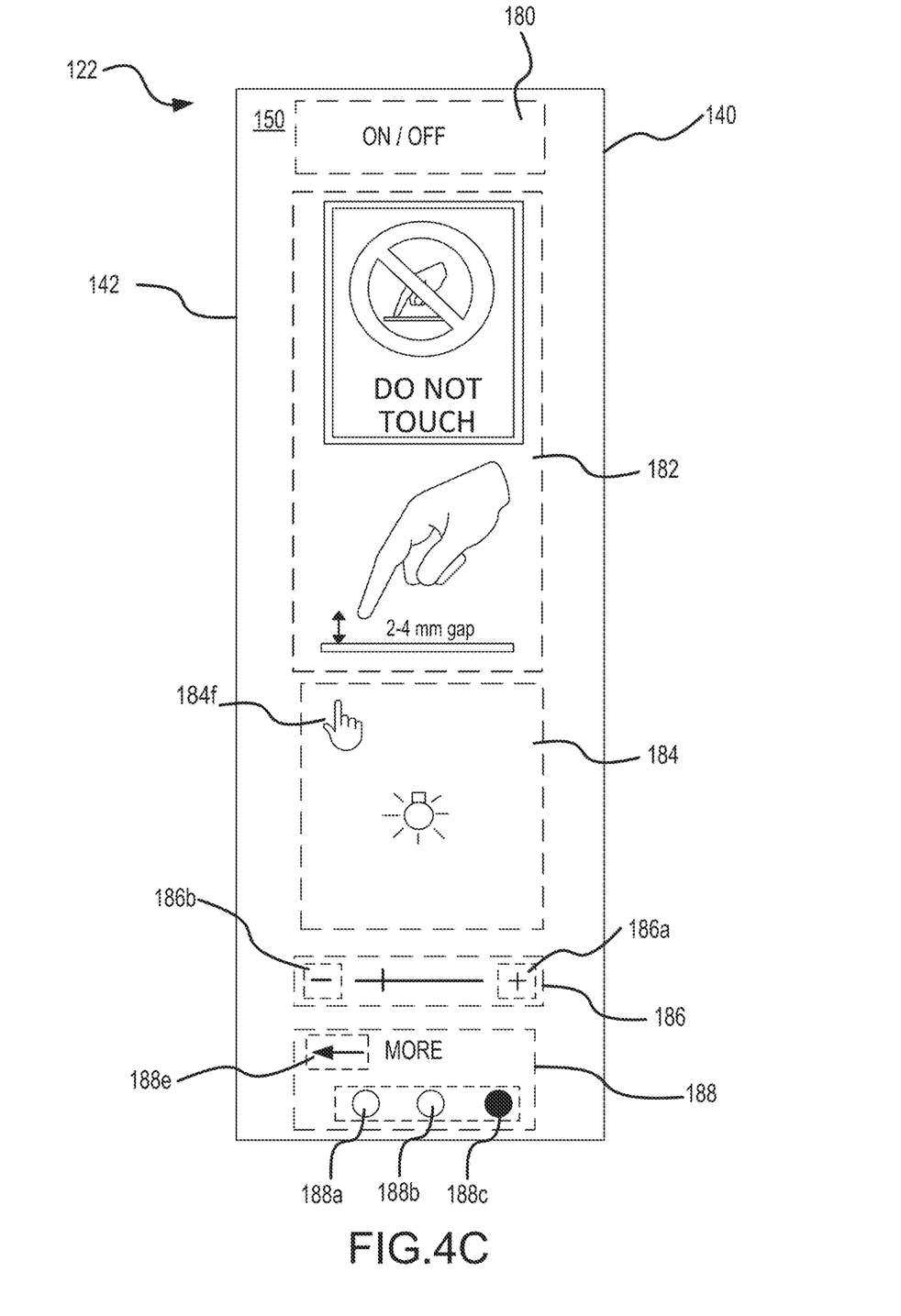

With combined reference to FIG. 2, FIG. 3 and FIG. 4A, in various embodiments, in the first mode of light control, mode control region 184 may display first mode control indicators 184a, 184b, 184c, 184d for controlling a location of the light beam output by light source 172. In response to determining object 154 is located over one of first control mode indicators 184a, 184b, 184c or 184d, touchless control module 146 sends a focus beam object detection signal (also referred to as a mode control object detection signal) 132 to light controller 130. The focus beam object detection signal 132 corresponds the direction indicated by the control mode indicator (e.g., right, left, up, down). In response to receiving the focus beam object detection signal 132, light controller 130 sends a focus beam light command 134 to light driver 170. The focus beam light command 134 causes light driver 170 to change which LEDs 174 are powered on and which LEDs 174 are powered off. Changing which LEDs 174 are powered on and powered off changes the direction of the light beam output by LEDs 174. In various embodiments, light assembly 112 may include an actuator configured to control the direction of the light beam output by light source 172. In this regard, the focus beam light commands 134 sent from light controller 130 may be cause actuation of the actuator, thereby changing the direction of the light beam in accordance with the focus beam object detection signal 132 received from touchless control module 146.

In various embodiments, the mode select region 188 of display 142 may include indicators 188a, 188b, 188c configured to convey which light control mode (e.g., first control mode, second control mode, or third control mode) the light assembly is currently operating in. For example, in the first control mode, indicator 188a may be different from indicators 188b and 188c. In various embodiments, in response to determining object 154 is located over a change-mode-right (or first) area 188d of mode select region 188, touchless control module 146 commands display 142 to switch from the current mode of light control to the current control mode +1. For example, if touchless control panel 122 is operating in the first mode and object 154 is detected over change-mode-right area 188d, then touchless control module 146 changes mode control region 184 to the second mode of light control, as shown in FIG. 4B. If touchless control panel 122 is currently in the second mode of light control and object 154 is detected over change-mode-right area 188d, then touchless control module 146 changes mode control region 184 to the third mode of light control shown in FIG. 4C. On/off region 180, instructions region 182, and intensity control region 186 may be the same in each of first mode of light control (FIG. 4A), the second mode of light control (FIG. 4B) and the third mode of light control (FIG. 4C).

With combined reference to FIG. 2, FIG. 3 and FIG. 4B, in various embodiments, in the second mode of light control, mode control region 184 may be employed by a user to increase or decrease an area of the light beam emitted by the array of LEDs 174. In the second mode of light control, mode control region 184 may display an instruction symbol 184e configured to convey to a user how to increase or decrease the area of the emitted light beam. For example, instruction symbol 184e may indicate that a "pinch" motion may be used to control the area of the emitted light beam.

In various embodiments, in response to determining object 154 is performing a "pinch-in" motion (e.g., in response to a distance between two points on object 154 decreasing over surface 150), touchless control module 146 sends a decrease area object detection signal (also referred to as mode control object detection signal) 132 to light controller 130. In response to receiving decrease area object detection signal 132, light controller 130 sends a decrease area light command 134 to light driver 170. The decrease area light command 134 causes light driver 170 to decrease a number LEDs 174 that are powered. In various embodiments, in response to determining object 154 is performing a "pinch-out" motion (e.g., in response to a distance between two points on object 154 increasing over surface 150), touchless control module 146 sends an increase area object detection signal (also referred to as mode control object detection signal) 132 to light controller 130. In response to receiving the increase area object detection signal 132, light controller 130 sends an increase area light command 134 to light driver 170. The increase area light command 134 causes light driver 170 to increase a number LEDs 174 that are powered.

In the second mode of light operation, indicator 188b in mode select region 188 may be different from indicators 188a and 188c. In various embodiments, in response to determining object 154 is located over change-mode-right area 188d of mode select region 188, touchless control module 146 commands display 142 to switch to the mode control region 184 to the third mode of light control (FIG. 4C). In various embodiments, in response to determining object 154 is located over a change-mode-left (or second) area 188e of mode select region 188, touchless control module 146 commands display 142 to switch from the current mode of light control to the current control mode −1. For example, if touchless control panel 122 is operating in the second mode of light control and object 154 is detected over change-mode-left area 188e, then touchless control module 146 changes mode control region 184 to the first mode of light control, as shown in FIG. 4A. If touchless control panel 122 is currently in the third mode of light control and object 154 is detected over change-mode-left area 188e, then touchless control module 146 changes mode control region 184 to the second mode of light control shown in FIG. 4B.

With combined reference to FIG. 2, FIG. 3 and FIG. 4C, in various embodiments, in the third mode of light control, mode control region 184 may be employed to create a custom shape light beam emitted by the LEDs 174. In the third mode of light control, mode control region 184 may display an instruction symbol 184f configured to convey to a user how to draw a custom area/shape for the emitted light beam. For example, instruction symbol 184e indicates that a "drawing" motion may be used to control the area and/or shape of the light beam emitted from light source 172. In accordance with various embodiments, mode control region 184 may also be configured to allow a user to reset the beam shape to a default shape and/or to clear areas of the custom pattern (e.g., using mode control region 184 a user could select or "draw" regions back to the "off state").

In various embodiments, in response to determining object 154 is performing a "drawing" motion (e.g., in response to object 154 drawing a pattern in the shape of a square, a triangle, a circle, or any other shape), touchless control module 146 sends a custom shape object detection signal (also referred to as mode control object detection signal) 132 to light controller 130. In response to receiving the custom shape object detection signal 132, light controller 130 sends a custom pattern light command 134 to light driver 170. The custom pattern light command 134 causes light driver 170 to power on and power off the LEDs 174 needed to form a light beam having the shape the user drew in mode control region 184.

In the third mode of light operation, indicator 188c in mode select region 188 may be different from indicators 188a and 188b. In various embodiments, in response to determining object 154 is in change-mode-left area 188e of mode select region 188, touchless control module 146 commands display 142 to switch mode control region 184 to the display associated with the second mode of light control (FIG. 4B).

Figure 5:
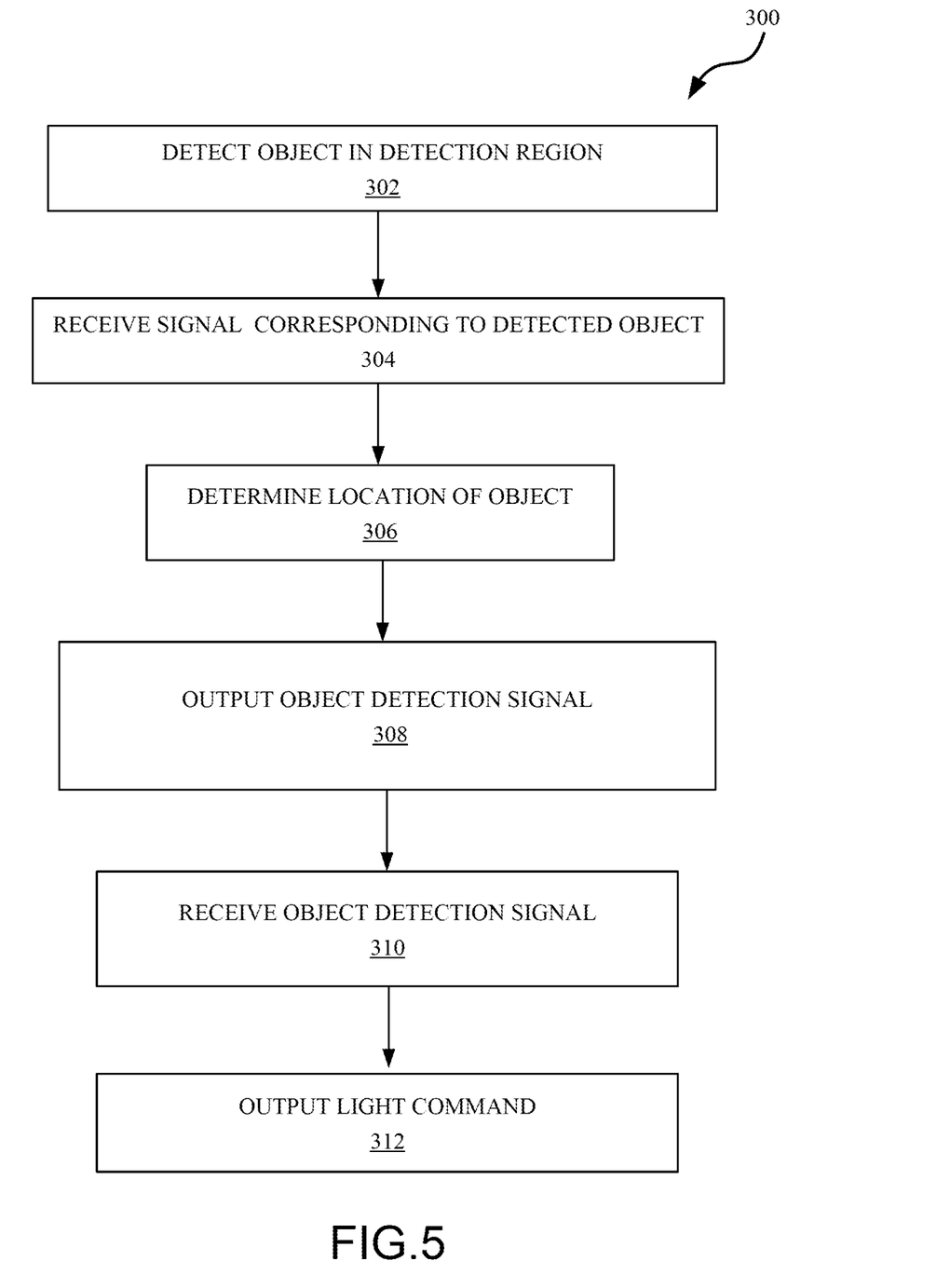
FIG. 5 illustrates a method for controlling a touchless light system, in accordance with various embodiments.

With reference to FIG. 5, a method 300 for controlling a touchless light system, such the first touchless light system 102 described above, is illustrated. In accordance with various embodiments, method 300 may comprise detecting, by a touchless sensor, an object located in a detection region over a surface of a touchless control panel (step 302) and receiving, by a touchless control module, an electrical signal from the touchless sensor (step 304). Method 300 may further include determining, by the touchless control module, a location of the object over the surface based on the electrical signal received from the touchless sensor (step 306) and outputting, by the touchless control module, an object detection signal based on the location of the object over the surface (step 308). Method 300 may further include receiving, by a light controller, the object detection signal (step 310) and outputting, by the light controller, a light command to a light assembly based on the object detection signal (step 312).

With combined reference to FIG. 5 and FIGS. 2 and 3 and 4A, in various embodiments, step 302 may include detecting, by touchless sensor 140, object 154 located in detection region D over surface 150 of touchless control panel 122. Step 304 may include receiving, by touchless control module 146, an electrical signal (e.g., user input 144) from touchless sensor 140. Step 306 may include determining, by touchless control module 146, a location of object 154 over surface 150 based on the electrical signal (e.g., user input 144) received from touchless sensor 140. Step 308 may include outputting, by touchless control module 146, an object detection signal 132 based on the location of object 154 over surface 150. Step 310 may include receiving, by light controller 130, the object detection signal 132 from touchless control module 146. Step 312 may include outputting, by light controller 130, light command 134 to light assembly 112 based on the object detection signal 132 received from touchless control module 146.

Figure 6A:
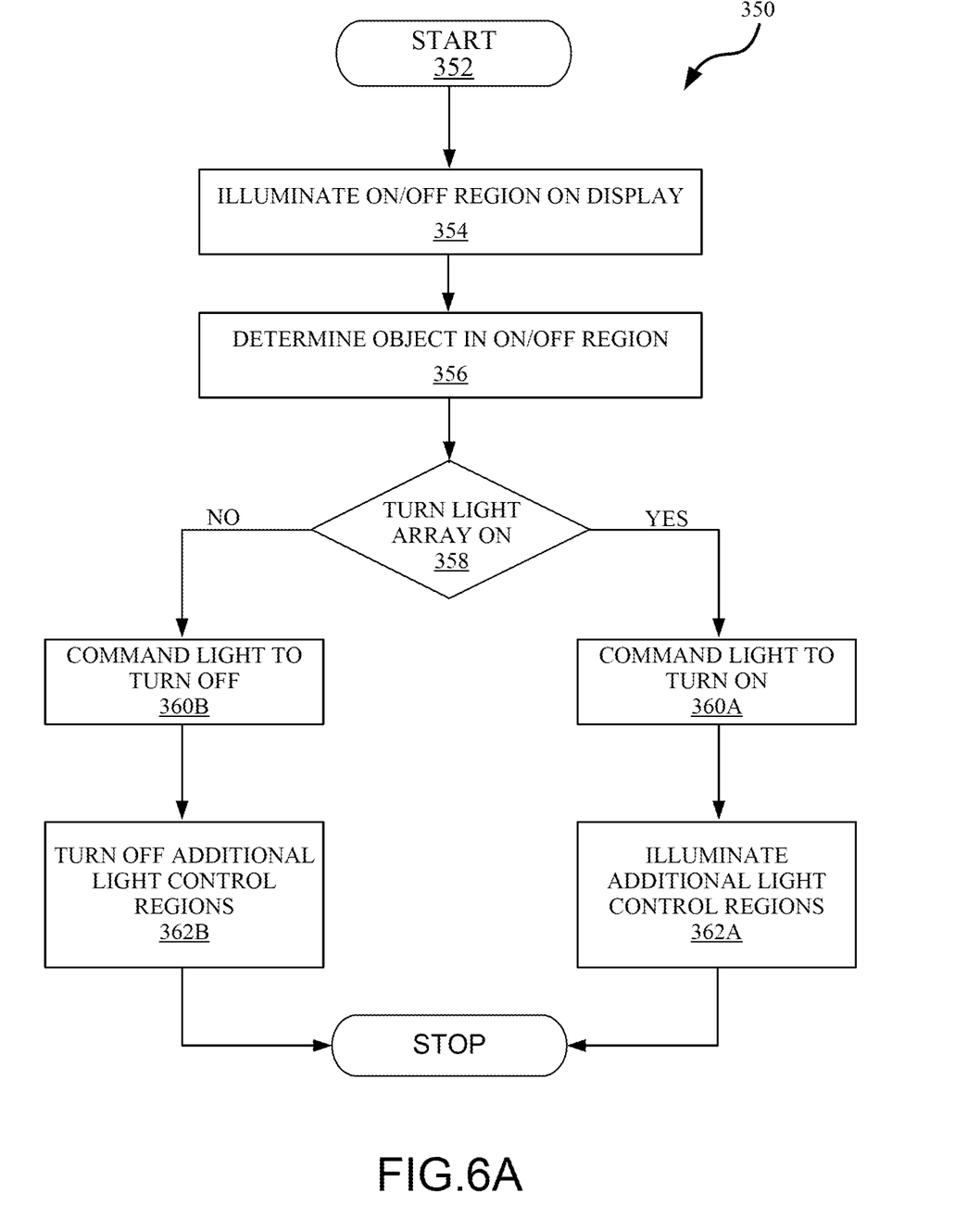
FIGS. 6A and 6B illustrate a method for controlling a touchless control panel, in accordance with various embodiments.

With reference to FIG. 6A, a method 350 for on/off touchless light control is illustrated. Method 350 may be carried on touchless control panel 122 by touchless control module 146. With combined reference to FIG. 6A, FIG. 3, and FIG. 4A, method 350 may begin by the touchless control panel 122 being powered on (step 352). In various embodiments, step 352 may include detection of object 154 in the detection region D of touchless sensor 140. In various embodiments, step 352 may include waking touchless control module up from a "sleep mode."

In response to touchless control panel 122 powering on, touchless control module 146 may cause display 142 to illuminate the on/off region 180 (step 354). Touchless control module 146 may then determine, based on signals output by touchless sensor 140, that an object 154 is located over on/off region 180 (step 356). In response to determining an object 154 is over on/off region 180, touchless control module 146 determines whether to turn the light assembly 112 on or to turn the light assembly 112 off (step 358).

For example, in response to touchless control module 146 determining the light assembly 112 is currently off, touchless control module 146 determines that the light assembly 112 should be turned on. In response to determining the light assembly 112 should be turned on, touchless control module 146 outputs an on/off object detection signal 132 to light controller 130, with the on/off object detection signal 132 being configured to cause light controller 130 to power on light source 172 (FIG. 2) (step 360A). In response to determining the light assembly 112 should be turned on, touchless control module 146 may also command display 142 to illuminate one or more other control regions (e.g., mode control region 184, intensity control region 186, and/or mode select region 188) on display 142 (step 362A).

If touchless control module 146 determines the light assembly 112 is currently powered on, then touchless control module 146 determines that the light assembly 112 should not be turned on (i.e., should be turned off). In response to determining the light should be turned off, touchless control module 146 outputs an on/off object detection signal 132 to light controller 130, with the on/off object detection signal 132 being configured to cause light controller 130 to power off light source 172 (FIG. 2) (step 360B). In response to determining the light assembly 112 should not be turned on, touchless control module 146 may also command display 142 to stop illuminating one or more other control regions (e.g., mode control region 184, intensity control region 186, and/or mode select region 188) on display 142 (Step 362B).

Figure 6B:
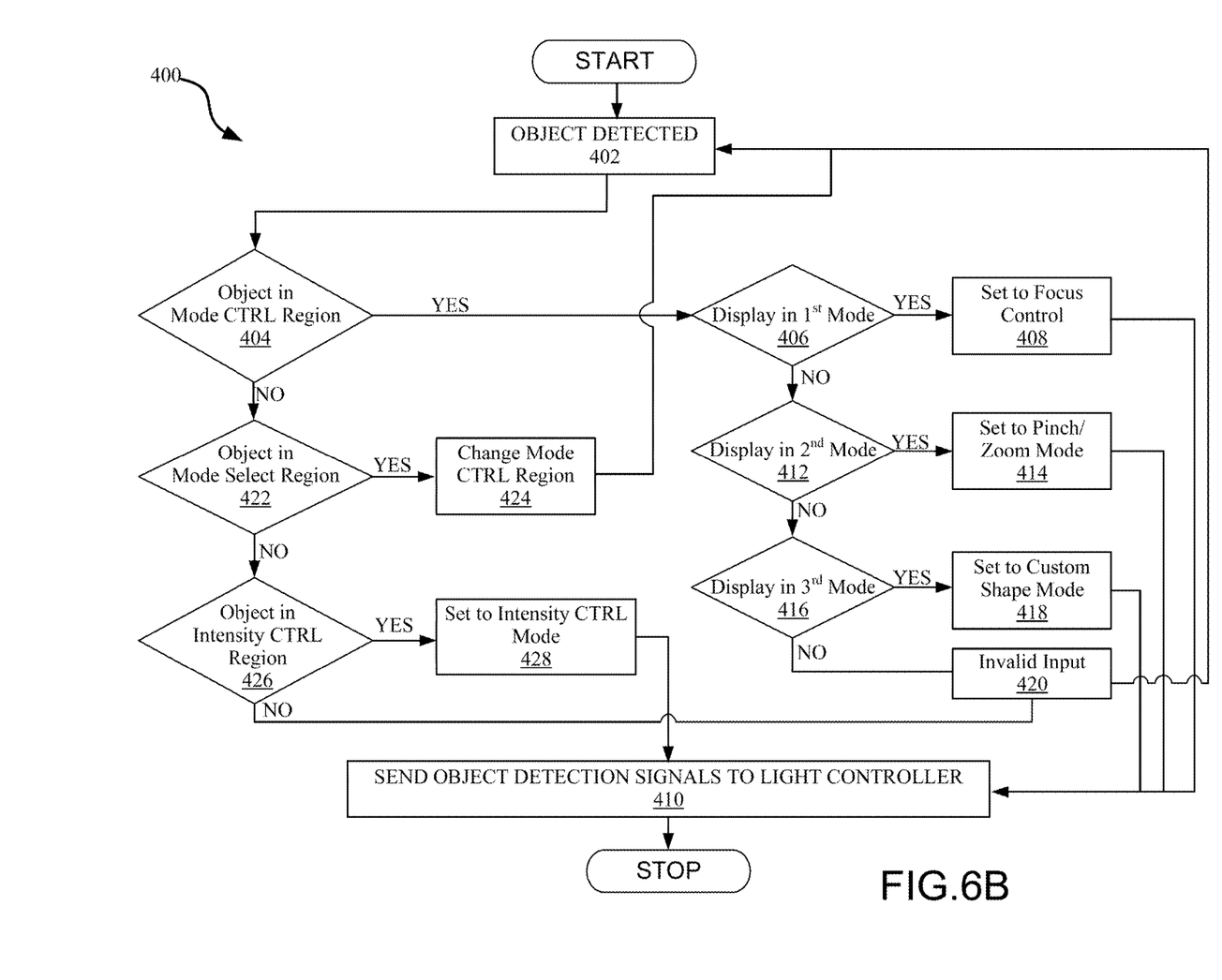

With reference to FIG. 6B, a method 400 for light mode control of a touchless light system is illustrated. Method 400 may be carried on touchless control panel 122 by touchless control module 146. With combined reference to FIG. 6B, FIG. 3, and FIG. 4A, method 400 may begin by touchless control module 146 determining an object 154 is located over display 142 (step 402). Step 402 may include touchless sensor 140 detecting an object with detection region D, outputting a user input signal 144, and touchless control module 146 receiving the user input signal 144.

In response to determining an object 154 is located over display 142, touchless control module 146 then determines in whether the object 154 is located over Mode control region 184 (step 404). In response to touchless control module 146 determining the object is located over mode control region 184, touchless control module 146 determines whether the display 142 is in the first mode of light control (step 406). In response to touchless control module 146 determining the display 142 is in the first mode of light control, touchless control module 146 configures touchless control panel 122 to operate in the first mode of light control, for example, to operate in focus control mode (step 408). As described above with reference to FIG. 4A, in the first mode of light control, touchless control module 146 may correlate the location of the object 154 with a desired change in the direction, or focus, of the light beam output by light assembly 112. In this regard, when the mode is set to the first mode of light control, touchless control module 146 may output focus beam object detection signal 132 to light controller 130 (step 410).

If touchless control module 146 determines the display 142 is not in the first mode of light control, touchless control module 146 then determine whether the display is in the second mode of light control (step 412). In response to touchless control module 146 determining the display 142 is in the second mode of light control, touchless control module 146 configures touchless control panel 122 to operate in the second mode of light control, for example, to operate in a pinch/zoom control mode (step 414). As described above with reference to FIG. 4B, in the second mode of light control, touchless control module 146 may correlate the movement of the object 154 over surface 150 with a desired change in area of the light beam output by light assembly 112. In this regard, when the mode is set to the second mode of light control, touchless control module 146 may output a change (e.g. increase or decrease) area object detection signal 132 to light controller 130 (step 410).

In response to touchless control module 146 determining the display 142 is not in the second mode of light control, touchless control module 146 determines whether the display 142 is in the third mode of light control (step 416). In response to touchless control module 146 determining the display 142 is in the third mode of light control, touchless control module 146 configures touchless control panel 122 to operate in the third mode of light control, for example, to operate in a custom shape control mode (step 418). As described above with reference to FIG. 4C, in the third mode of light control, touchless control module 146 may correlate the movement of the object 154 over surface 150 with a desired change in the shape of the light beam output by light assembly 112. In this regard, when the mode is set to the third mode of light control, touchless control module 146 may output custom shape object detection signal 132 to light controller 130 (step 410). In response to touchless control module 146 determining the display 142 is not in any of the first, second or third mode of light control, touchless control module 146 may determine the signal is an invalid input (Step 420).

Returning to step 404, in response to touchless control module 146 determining the object 154 is not located over mode control region 184, touchless control module 146 determines whether the object 154 is located over the mode select region 188 (Step 422).

If touchless control module 146 determines the object 154 is located over the mode select region 188, touchless control module 146 changes the image(s) displayed in mode control region 184 of display 142 (step 424). For example, if in step 424, touchless control module 146 determines the object 154 is located over the change-mode-right area 188d of mode select region 188, touchless control module 146 commands display 142 to switch from the current mode of light control to the current control mode +1 (e.g., from first mode to second mode or from second mode to first mode). If in step 424 touchless control module 146 determines the object 154 is located over the change-mode-left area 188e of mode select region 188, touchless control module 146 commands display 142 to switch from the current mode of light control to the current control mode −1 (e.g., from second mode to first mode or from third mode to second mode).

Returning to step 422, in response to touchless control module 146 determining the object 154 is not located over mode select region 188, touchless control module 146 determines whether the object 154 is located over the intensity control region 186 (Step 426).

If touchless control module 146 determines the object 154 is located over the intensity control region 186, touchless control module 146 configures touchless control panel 122 to operate in an intensity control mode (step 428). In intensity control mode, touchless control module 146 may determine whether the object 154 is located over the increase intensity area 186a of intensity control region 186 or over the decrease intensity area 186b of intensity control region 186. In this regard, when the mode is set to the intensity control mode, touchless control module 146 outputs increase intensity object detection signal 132 or decrease intensity object detection signal 132 to light controller 130 based on whether the object 154 is located over increase intensity area 186a or decrease intensity area 186b (step 410).

The system and methods described herein may be described in terms of functional block components, optional selections, and various processing steps. It should be appreciated that such functional blocks may be realized by any number of hardware or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, VBScript, COBOL, MICROSOFT® Active Server Pages, assembly, PERL®, PHP, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like.

Benefits, other advantages, and solutions to problems have been described herein with regard to specific embodiments. Furthermore, the connecting lines shown in the various figures contained herein are intended to represent exemplary functional relationships or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A touchless light system, comprising:
 a light assembly;
 a light controller operably coupled to the light assembly; and
 a touchless control panel including an on/off region, a mode control region, and a mode select region, the on/off region, the mode control region, and the mode select region being separate regions, wherein the touchless control panel is configured to detect and interpret a user input and send an object detection signal to the light controller based on the user input, wherein the light controller is configured to send a light command to the light assembly based on the object detection signal received from the touchless control panel, wherein the touchless control panel includes:
 a touchless sensor configured to detect an object within a detection region over the on/off region, the mode control region, and the mode select region; and
 a touchless control module operably coupled to the touchless sensor, the touchless control module being configured to determine whether the object is at a location over the on/off region, the mode control region, or the mode select region based on an electrical signal received from the touchless sensor, wherein the touchless control module outputs the object detection signal based on the location of the object, wherein the touchless control module is configured to send an on/off object detection signal to the light controller in response to determining the object is located over the on/off region, and wherein the light controller is configured to output an on/off light command to the light assembly in response to receiving the on/off object detection signal, wherein the touchless control module is configured to send an increase intensity object detection signal to the light controller in response to determining the object is over an increase intensity area of the touchless control panel, and wherein the light controller is configured to output an increase intensity light command to the light assembly in response to receiving the increase intensity object detection signal, wherein the touchless control module is configured to send a decrease intensity object detection signal in response to determining the object is located over a decrease intensity area of the touchless control panel, and wherein the light controller is configured to output a decrease intensity light command to the light assembly in response to receiving the decrease intensity object detection signal, wherein the touchless control module is configured to send a mode control object detection signal in response to determining the object is located over the mode control region, and wherein the light controller is configured to output at least one of a focus beam light command, an increase area light command, a decrease area light command, or a custom pattern light command in response to receiving the mode control object detection signal.

2. The touchless light system of claim 1, wherein the touchless sensor is configured to project an electromagnetic field over the on/off region, the mode control region, and the mode select region of the touchless control panel.

3. The touchless light system of claim 1, wherein the touchless control module is configured to change an image displayed in the mode control region in response to determining the object is located over the mode select region, and wherein the image depicts instructions for using the mode control region.

4. A method for controlling a touchless light system, the method comprising:
 detecting, by a touchless sensor, an object located in a detection region over a surface of a touchless control panel;
 receiving, by a touchless control module, an electrical signal from the touchless sensor;
 determining, by the touchless control module, whether the object is at a location over an on/off region, a mode control region, or a mode select region of the surface based on the electrical signal received from the touchless sensor;
 outputting, by the touchless control module, an object detection signal based on the location of the object;
 receiving, by a light controller, the object detection signal; and
 outputting, by the light controller, a light command to a light assembly based on the object detection signal, wherein the light command comprises at least one of a focus beam light command, an increase area light command, a decrease area light command, or a custom pattern light command.

5. The method of claim 4, wherein determining, by the touchless control module, the location of the object over the surface comprises determining, by the touchless control module, whether the object is located over an intensity control region of the surface.

6. The method of claim 5, further comprising:
 determining, by the touchless control module, whether to turn on the light assembly or turn off the light assembly; and
 at least one of:
 commanding, by the touchless control module, a display of the touchless control panel to illuminate at least one of the mode control region, the intensity control region, or the mode select region in response to the touchless control module determining to turn on the light assembly; or
 commanding, by the touchless control module, the display of the touchless control panel to stop illuminating at least one of the mode control region, the intensity control region, or the mode select region in response to the touchless control module determining to turn off the light assembly.

7. The method of claim 5, wherein determining, by the touchless control module, the location of the object over the surface comprises determining, by the touchless control module, the object is located over an increase intensity area of the intensity control region of the surface, and wherein the light command is configured to increase an intensity of a light emitted by the light assembly.

8. The method of claim 4, wherein determining, by the touchless control module, the location of the object over the surface comprises determining, by the touchless control module, the object is located over a decrease intensity area of the intensity control region of the surface, and wherein the light command is configured to decrease an intensity of a light emitted by the light assembly.

9. The method of claim 4, wherein determining, by the touchless control module, the location of the object over the surface comprises:
  determining, by the touchless control module, the object is located over the mode select region of the surface, and
  wherein the method further comprises:
  commanding, by the touchless control module, a display of the touchless control panel to change an image displayed in the mode control region, wherein the image depicts instructions for using the mode control region.

10. An article of manufacture including a tangible, non-transitory computer-readable storage medium having instructions stored thereon for controlling a touchless light system that, in response to execution by a touchless control module, cause the touchless control module to perform operations comprising:
  receiving, by the touchless control module, an electrical signal from a touchless sensor;
  determining, by the touchless control module, whether an object is at a location over an on/off region, a mode control region, or a mode select region of a surface of a display based on the electrical signal received from the touchless sensor, wherein determining, by the touchless control module, the location of the object over the surface comprises:
    determining, by the touchless control module, whether the display is in at least one of a first mode of light control, a second mode of light control, or a third mode of light control, in response to determining the object is located over the mode control region; and
    determining, by the touchless control module, whether to output an object detection signal as at least one of a focus beam object detection signal, a change area object detection signal, or a customs shape object detection signal based on whether the display is in the first mode of light control, the second mode of light control, or the third mode of light control; and
  outputting, by the touchless control module, the object detection signal to a light controller based on the location of the object.

11. The article of manufacture of claim 10, wherein determining, by the touchless control module, the location of the object over the surface further comprises:
  determining, by the touchless control module, whether the object is located over an intensity control region of the surface; and
  determining, by the touchless control module, whether to output the object detection signal as at least one of an increase intensity object detection signal or a decrease intensity object detection signal sending in response to the touchless control module determining the object is located over the intensity control region of the surface.

12. The article of manufacture of claim 10, wherein the operations further comprise:
  commanding, by the touchless control module, the display to illuminate at least one of the mode control region, an intensity control region, or the mode select region in response to the touchless control module determining the object is located over the on/off region of the surface.

13. The article of manufacture of claim 10, wherein determining, by the touchless control module, the location of the object over the surface comprises:
  changing, by the touchless control module, an image displayed in the mode control region of the display in response to the touchless control module determining the object is located over at least one of a first change mode area or a second change mode area in the mode select region of the display, wherein the image depicts instructions for using the mode control region.

* * * * *